United States Patent [19]

LaCourt

[11] Patent Number: 4,811,058
[45] Date of Patent: Mar. 7, 1989

[54] MICROFILM CASSETTE

[75] Inventor: Michael W. LaCourt, Rochester, N.Y.

[73] Assignee: Eastman Kodak Company, Rochester, N.Y.

[21] Appl. No.: 141,864

[22] Filed: Jan. 11, 1988

[51] Int. Cl.$^4$ .......................................... G03B 27/58
[52] U.S. Cl. ..................................... 355/72; 352/78 R
[58] Field of Search ................. 355/72, 65; 352/72, 352/78, 224

[56] References Cited

U.S. PATENT DOCUMENTS

| D. 257,770 | 1/1981 | Loofbourow | D14/11 |
|---|---|---|---|
| 2,165,739 | 7/1939 | Verkinderen | 242/71 |
| 3,229,397 | 1/1966 | Shaw | 40/86 |
| 3,434,783 | 3/1969 | Sakaki et al. | 352/224 |
| 3,516,342 | 6/1970 | Luescher | 95/31 |
| 3,586,430 | 6/1971 | Rempala | 353/26 |
| 4,148,579 | 4/1979 | Axelrod et al. | 355/41 |
| 4,153,361 | 5/1979 | Axelrod | 354/275 |
| 4,175,719 | 11/1979 | Speckman et al. | 242/197 |
| 4,214,828 | 7/1980 | Axelrod | 354/275 |
| 4,255,026 | 3/1981 | Ebener, Jr. | 353/26 R |

Primary Examiner—Monroe H. Hayes
Attorney, Agent, or Firm—Dennis R. Arndt

[57] ABSTRACT

A film cassette has a bi-directional film transport capable of being driven externally of the cassette and having both extremities of the film enclosed within the cassette. In the cassette a pair of film reels are rotatably supported in symmetrical relation to a diagonal plane, defining an axis of symmetry for the cassette, and extending between the reels and bisecting a corner of the cassette. The two exposure windows are adjacent the corner at respective opposite sides thereof and in symmetrical relation to the plane. Guide means adjacent the exposure windows in the cassette establish a film path between the film reels. The cassette can be selectively inserted into a cassette chamber in a camera in either of two modes of orientation to present a selected one of the exposure windows to the optical path in the camera.

5 Claims, 9 Drawing Sheets

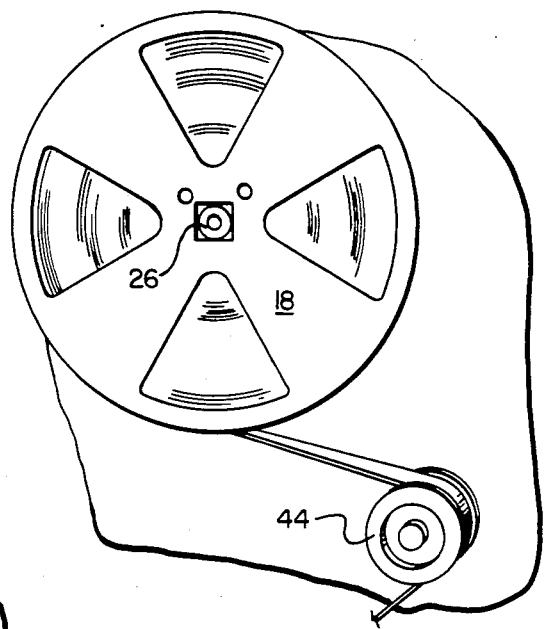
FIG. 6A
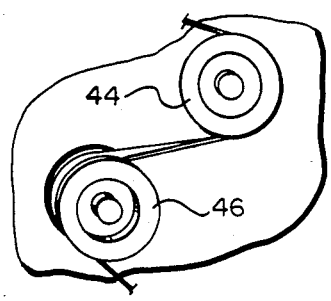
FIG. 6B
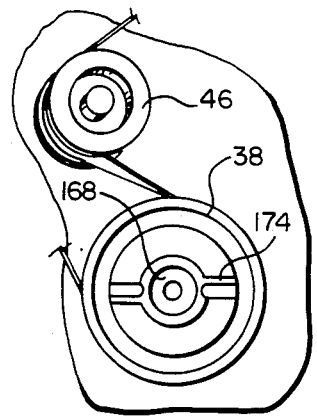
FIG. 6C
FIG. 6D

MICROFILM CASSETTE

CROSS REFERENCE TO RELATED APPLICATIONS

Reference is made herein to the following commonly-assigned, copending U.S. patent applications Ser. No. 142,579, entitled: Film Cassette; in the name of M. LaCourt; Ser. No. 142,578, entitled: Cassette Information Controller and Memory, in the names of D. Momot and E. Townsend; Ser. No. 142,576, Cassette/Machine Optical Coupled Interface, in the names of D. Momot and E. Townsend; and Ser. No. 142,577, entitled: Cassette Orientation Detection Apparatus, in the name of E. Townsend, filed concurrently herewith.

TECHNICAL FIELD

The present invention relates to microfilm cassettes and in particular, cassettes for use with roll-type microfilm wherein the exposure of the film takes place within the cassette.

BACKGROUND ART

A convenient and inexpensive manner in which large quantities of data and information can be stored is by reducing the size of the original material. One commonly used method of storing reduced size materials is by copying them onto strips of microfilm which after processing, can be wound onto a reel for compact storage.

It is common practice with standard size documents to use an automatic rotary-type microfilm camera wherein the documents are fed automatically and filmed as they pass through the machine. It is a conventional practice primarily for convenience that light-tight film cassettes are used with this type of microfilming device. Standard unexposed film reels as received from the manufacturer are loaded into reusable film cassettes in a darkroom and are properly threaded through appropriate rollers to a take-up roll. The cassette is then closed with a light-tight cover. The cassette may then be carried into a light area and loaded into a machine and removed at any time without any danger of exposing the film contained therein. In fact, it is common practice to film a number of documents that would constitute a job or a run that would cause only a limited amount of the film in the cassette to be exposed. The cassette could then conveniently be removed from the camera until more documents associated with that job could be accumulated for filming. In the meantime, another cassette could be inserted in the microfilm camera to perform entirely different filming operations and in fact, may be exposed using a different format.

One format commonly used in microfilming is known as "duo" filming; that is, where images are placed along one lateral half of the film while it is moving in one direction and the other lateral half of the film is exposed during motion in the opposite direction. However, this normally required that the cassette be removed from the machine and taken to a darkroom where the cover was removed and the now full takeup reel be turned over, exchanging places with the empty supply reel. With the film once again properly threaded in the cassette, the cassette may be returned to the machine so that the remaining lateral half of the film could be exposed.

One object of the present invention is to provide a cassette having a bi-directional film transport and dual imaging ports, thereby allowing duo filming without requiring the re-loading of the cassette as in the past.

Another object of the present invention is the provision that the film reels within the cassette be in symmetrical relation to a diagonal plane, containing an axis of symmetry, extending between the reels and bisecting the corner of the cassette with two exposure windows adjacent the corner and at respective opposite sides thereof in symmetrical relation to the diagonal plane extending between the reels. This allows the first side of the film to be exposed and the cassette may then be rotated about its axis of symmetry and reloaded into its original drive location so that the second half of the film may now be exposed through the second image port.

The cassette is also configured to support a dual filming system where two rolls of film are exposed simultaneously. With such a system, two film drives could be used with one cassette for example, placed above another with each cassette being loaded into respective film chambers. Such an arrangement was commonly used if the film mode was either simplex or duplex so that two identically exposed rolls of film were provided, and after processing, a working roll and a backup or archival roll was created. As mentioned earlier, additional problems were encountered if the duo or duo-duplex modes were being used in conjunction with two film cassettes. This would require that, after exposure of the first lateral side of the film was complete for each cassette, both cassettes would then be removed from the machine, taken to a darkroom where the take-up reels were turned over and re-inserted into the cassette in place of the supply reel and the film path re-threaded and the cassettes returned to the machine for the exposure of the remaining lateral half of each film.

The use of a bi-directional film transport and a cassette configured according to the present invention would, after the first pass of the film but before the supply reels were depleted, allow each cassette to be removed from its respective cassette chamber and rotated about its axis of symmetry and once again re-inserted into its original cassette chamber so that the remaining lateral portion of the film could be exposed through the other exposure window in the film cassette. It should be noted that it is not necessary that the cassette be returned to its original chamber; that is, just the normal practice.

DISCLOSURE OF THE INVENTION

The present invention provides a film cassette for use in a microfilm camera having optical means for exposing film in the cassette. The cassette has a top member and a bottom member joined by wall means to define an enclosure having at least one corner. Within said enclosure, a pair of film reels are rotatably supported in symmetrical relation to a diagonal plane establishing an axis of symmetry for the cassette, and extending between the reels and bisecting the corner of the cassette. The reels are capable of being driven externally of the cassette by the camera, thereby providing movement of the film between the reels. The cassette further comprises means defining two exposure windows in the wall means adjacent said corner and at respective opposite sides thereof in symmetrical relation to the plane. Guide means are provided within the enclosure for establishing a film path between the film reels and adjacent both exposure windows, whereby the cassette can be selectively inserted into the camera in either of two modes of orientation to present a selected one of the exposure windows to the optical means.

BRIEF DESCRIPTION OF THE DRAWINGS

Modes of carrying out the invention will be described with reference to the drawings wherein:

FIG. 6A is a fragmentary view taken between a film reel and a film idler roller;

FIG. 6B is a fragmentary view taken between first and second idler rollers;

FIG. 6C is a fragmentary view taken between a second idler roller and the film metering roller;

FIG. 6D is a cross-section of the web taken between idler rollers;

MODES OF CARRYING OUT THE INVENTION

A preferred embodiment of the film cassette according to the present invention will be described in detail with reference to the drawings.

Figure 1:
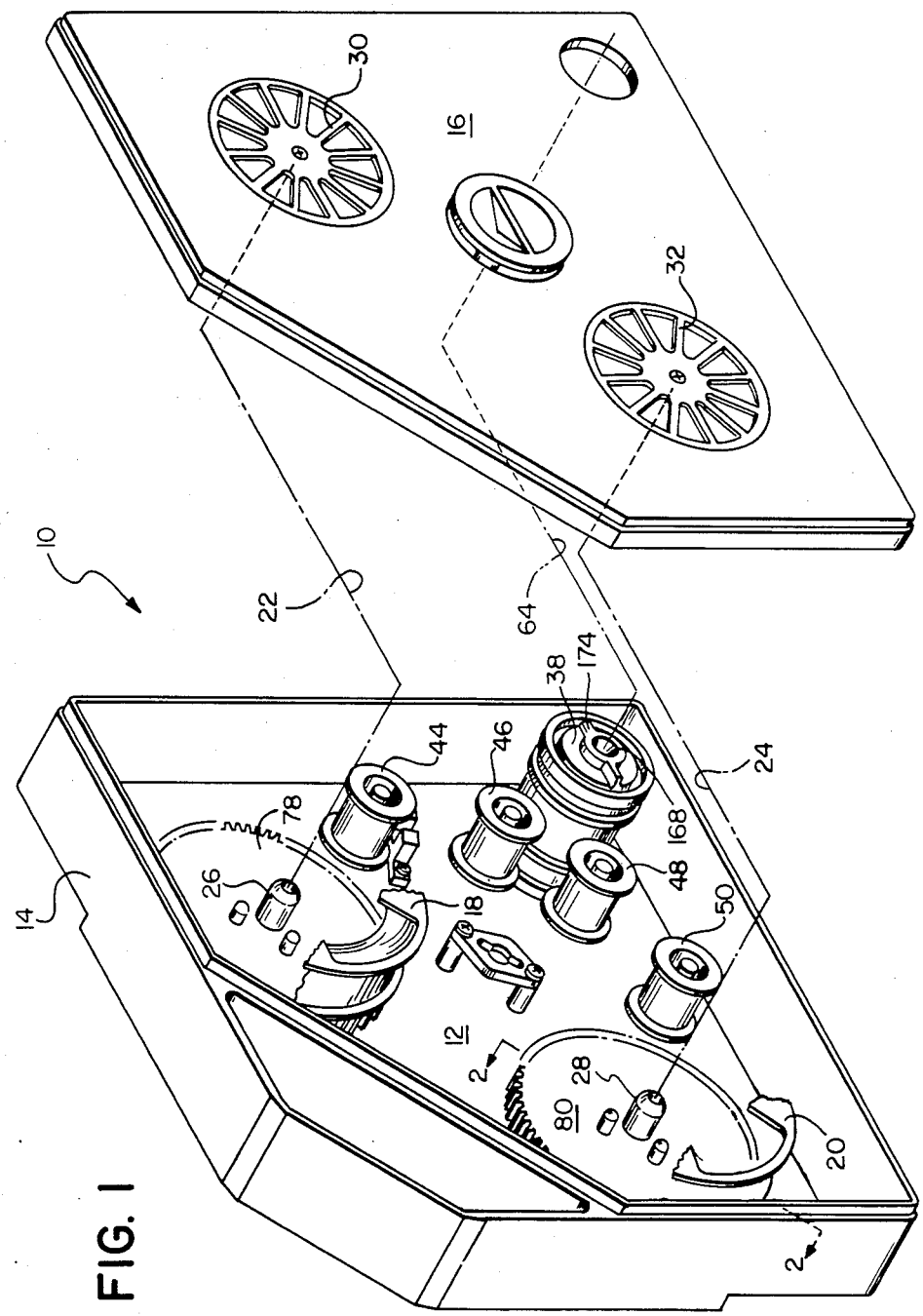
FIG. 1 is a diagrammatic perspective view of a microfilm cassette with the lid removed and embodying features of the present invention.

Referring to FIG. 1, the film cassette 10 embodying the present invention includes a cassette housing which is generally in the form of a substantially square base 12 having raised edge walls 14 around its periphery. A light-tight lid 16 is adapted to be fitted over the edge walls 14 of base 12. First and second reels 18, 20 may act as either film supply or take-up reels and are mounted with parallel axes of rotation 22, 24 respectively and in general are in coplanar relationship on the base 12 and supported by means of a pair of axial shafts 26, 28. The reels are held on the shafts by the light-tight lid 16 when it is attached to the edge walls 14 of the square base 12. These reels can be rotated in either direction from the exterior of the cassette 10 by star drives 30 and 32 in lid 16. The base 12 has similar drives (not shown), which are aligned on the axes of rotation 22 and 24. These star drives are engaged by drive spindles 164 and 166 in the microfilmer camera. A metering roller 38 is adapted to float freely until it is aligned with a pair of locating pins 40, 42 which are substantially parallel to the reel shafts 26, 28. The metering roller 38 can also be rotated in either direction by the external drive means, as will be discussed later in greater detail. A pair of "wobbly" idler rollers 44, 46, and 48, 50 are located between each of the reels 18, 20 and the metering roller 38.

Figure 4:
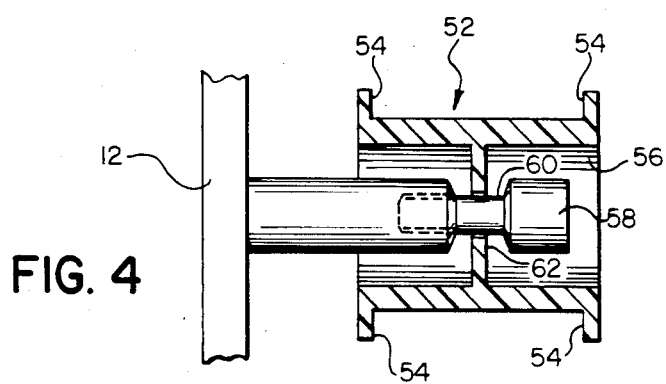
FIG. 4 is an elevation, partially in section, of a bidirectional idler roller according to the present invention.

The construction of the "wobbly" idler rollers 44, 46, 48, and 50 is shown in detail in FIG. 4 with all four idler rollers being constructed the same. The "wobbly" idler rollers steer the web between metering roller 38 and the film reels 18 and 20. A hard plastic mechanical flanged roller 52, with the distance between flanges 54 being slightly greater than the width of the film, is used. The roller has a cylindrical hole 56 passed through its center, so that the roller may be slipped over a shaft 58 of substantially uniform diameter. The interior diameter of cylindrical hole 56 is not uniform, as can be seen from FIG. 4. The mid-portion of the opening has a reduced diameter, approximately in the center section. Therefore, the idler roller, when placed on a shaft 58, will be free to wobble slightly about the smaller diameter portion 62 of cylindrical hole 56 where it engages a necked-down portion 60 of the shaft 58. Thus, the roller tends to assume a position that is laterally aligned with either metering roller 38 or one of the reels 18 and 20. Thus, the outer sleeve of the roller 52 between flanges 54 can tilt to accommodate film that approaches idler roller 52 in a position not in proper alignment, therewith.

In operation, should there be any misalignment of the film in its course of travel, which is due on occasion to one reel or another not being in proper alignment with the metering roller or perhaps due to an irregularity in winding the film on the reel, the wobby idler roller will tend to compensate for these conditions. Because the film is not flexible in the plane of the film, the film will force the outer sleeve of the roller to a tilted position as illustrated in FIGS. 6A–C, and FIG. 7. This tilting will therefore avoid wrinkling or distorting the film at one or both edges, a condition that may otherwise occur, but for the "wobbly" roller.

The idler rollers 44, 46, 48, and 50 are also capable of being positioned laterally by the film by moving axially along shaft 58. Lateral motion of the roller is restricted to the width of the necked-down portion 60 of shaft 58 on which the reduced bore portion 62 of cylindrical hole 56 moves. Film passing between the shoulders defined by flanges 54 on the roller is constantly urging the roller laterally in one or the other direction along shaft 58. As used herein, the term "lateral" is used in the same sense with respect to the film, the cassette, the reels and the rollers, e.g. endwise movement of the rollers is referred to as "lateral". Thus, the roller can shift to accommodate changes in the effective width of the film increases within permissible tolerance, or edge waviness, which causes cyclic variations in lateral motion.

Loading of The Cassette

A full roll of unexposed film on a standard reel 18 provided by the film manufacturer is placed within the cassette, either in a darkroom or by allowing a few convolutions of film on the reel to become exposed. During this loading procedure, a short length of film is withdrawn from the new roll, threaded over the first pair of idler rollers, 44, 46 metering roller 38, the second pair of idler rollers 48, 50 and cinched onto the empty reel 20. Each of these idler rollers 44, 46, 48 and 50 can float laterally along their shaft and assume an infinite number of angular positions with a range of approximately 20 degrees.

Figure 5:
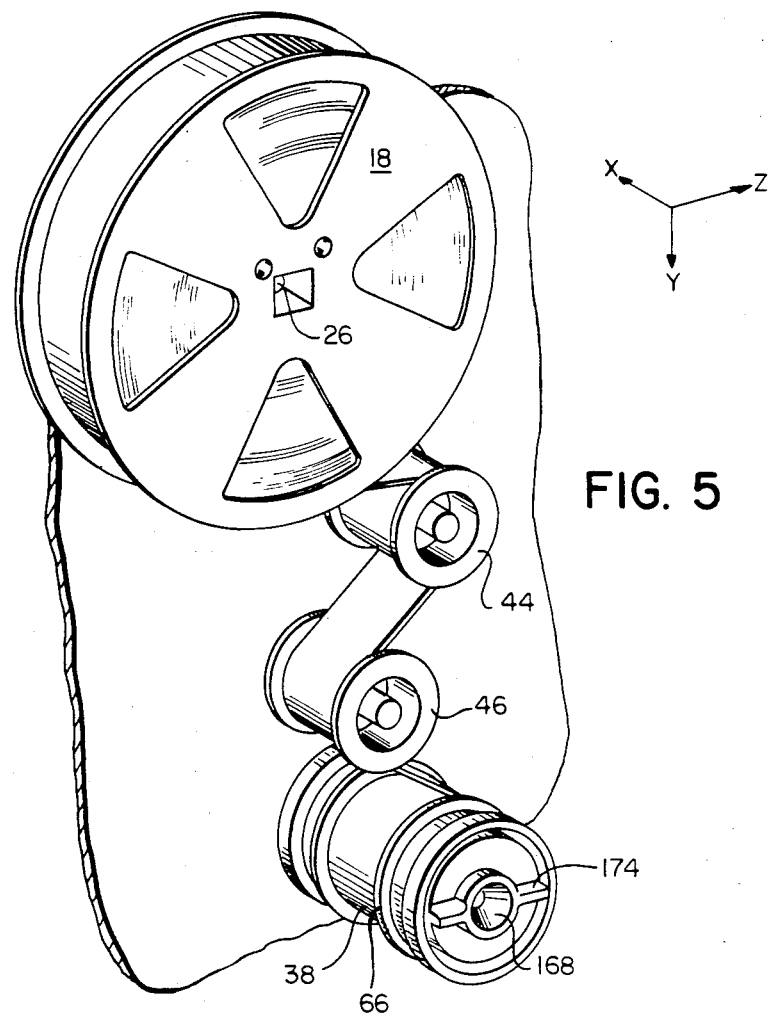
FIG. 5 is a perspective view of a portion of the structure shown in FIG. 1 with the film carried thereon.
Figure 8:
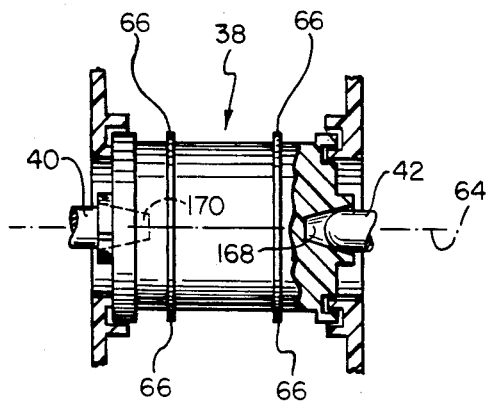
FIG. 8 is an elevational view of the metering roller and alignment spindles, partially in section.

FIG. 5 illustrates the film path from the supply reel 18 to metering roller 38. The film path is displayed relative to an XYZ coordinate system. The metering roller axis of rotation 64 and the supply reel axis 22 are rigidly fixed in space at some small angle relative to the X-axis, due to manufacturing tolerances. The lateral position of the web with respect to the Z-Y plane is confined between flanges 66 of metering roller 38 and the flanges of supply reel 18. There are three web spans between the reel 18 and metering roller 38, they are between supply reel 18 and idler roller 44, idler rollers 44 and 46, and between idler roller 46 and metering roller 38 as shown in FIG. 5. FIG. 6 A, B and C illustrate a view which is perpendicular to the edge of the film for each of these film spans in FIG. 5 respectively and illustrates how the "wobbly" roller can facilitate the steering of each segment of the web.

In FIG. 6A, the direction of the film leaving the reel must be perpendicular to reel axis 22 because the film resists bending within the plane of the film. Therefore, the axis of idler roller 44 must align itself parallel to the axis of reel 18. The angular position of the axis of the idler roller 44 with respect to the X-axis will track the angle of the axis of rotation 22 for reel 18 with respect to the X-axis when viewed perpendicular to the web span.

In a similar fashion, as can be seen in FIG. 6C, the film must engage metering roller 38 perpendicular to its axis of rotation 64 at a fixed lateral position. The axis of idler roller 46 is parallel to the axis 64 of metering roller 38 when viewed perpendicular to the web span.

As shown in FIG. 6B the lateral positions of idler rollers 44 and 46 have essentially been dictated by metering roller 38 and film reel 18 respectively. Because the web is assumed to be stiff within the plane of the film, both the axes of the idler rollers 44 and 46 must be parallel to each other in the plane of the connecting film span.

The fact that the film is able to twist as illustrated in FIG. 6D is the phenomenon that allows the idler rollers 44 and 46 to assume the requisite angular and lateral positions illustrated in FIG. 6A to FIG. 6C. It should be understood that the same twisting action may be found in the web sections illustrated in FIG. 6A and FIG. 6C to a greater or lesser degree.

The degree of film twist is dependent upon the spacing and therefore the length of the resultant film span between film reel 18 and idler roller 44; the two idler rollers 44 and 46 and the span between idler roller 46 and metering roller 38. In general, the film span between the fixed axis flanged rollers (i.e., metering rollers 38, supply reel 18, and take-up reel 20) and the "wobbly" idler rollers 44, 46, 48, and 50 associated therewith should be small in comparison to the distance between the adjacent idler rollers along the film path. This will minimize the amount of film twist required between the fixed axis flanged roller and the adjacent idler roller because a smaller correction angle is required over the greater span. Essentially, the shorter the film span between the two idler rollers, the more difficult it is for the film to make the necessary twist or adjustment required to compensate for any misalignment that may exist.

Even though the above discussion is directed to a specific film reel 18 and idler rollers 44 and 46 in FIG. 6A through FIG. 6C the same reasoning is applicable to film reel 20 and idler rollers 48 and 50, inasmuch as they are symmetrical about an axis of symmetry 68 which passes through a diameter of metering roller 38.

Figure 7:
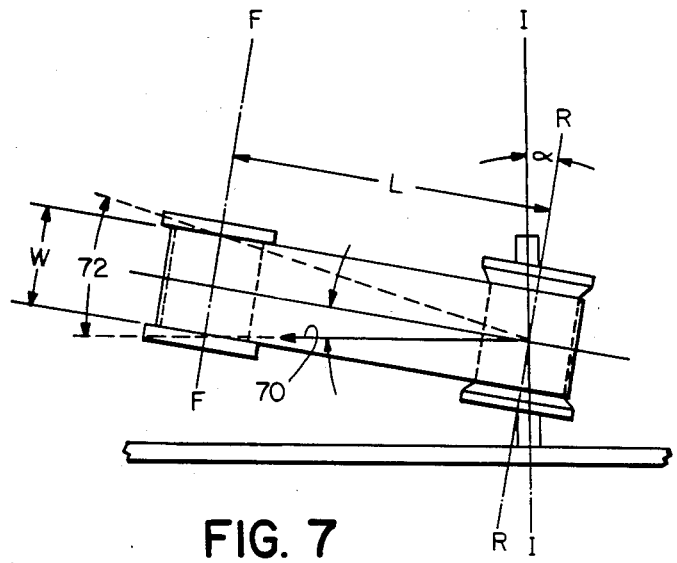
FIG. 7 is a schematic diagram showing the geometric relationship between a fixed roller and a "wobbly" roller.

To maintain a fully tensioned film span and prevent a slack edge from developing on the film between a flanged fixed axis element (such as film reels 18, 20 and metering roller 38) and an adjacent idler roller. The tension vector 70 within the film span must be supported between the two rollers as illustrated in FIG. 7. Thus if the tension vector 70 is alllowed to move outside the tension zone 72 shown in FIG. 7 the opposite edge of the film will begin to go slack. It should be noted that use of a single "wobbly" idler roller is possible if the distance between the fixed axis elements is large enough to ensure that the film can adjust in the span between the fixed axis elements and the "wobbly" idler rollers.

The guidelines for determining the allowable angle of tilt between the idler roller axis and its fixed shaft may be given by the following:

$$\text{Tan } \alpha \, Å \, \frac{W}{2L}$$

where
$\alpha$ = the angle between the axis F—F of a flanged fixed axis roller and the axis I—I of the idler roller shaft.
W = the web width
L = length of the web span. Specifically it can be seen that if the length of this web span is 2.215 cm (0.872 inches) and this width of 16 mm film is 1.008 cm (0.630 inches) so that:

$$\text{Tan } \alpha \, Å \, \frac{.630}{2(.872)}$$

$$\alpha \, Å \, 20°$$

Thus, in the example the allowable angle of tilt between the idler roller axis and the fixed axis F—F metering roller 38 is 20 degrees. This prevents the tension vector 72 from straying outside the flanges of the fixed roller. The axis of rotation R—R will align itself to be parallel with the axis F—F of a fixed axis roller within this range and in the film plane.

Anti-Clockspring Mechanism

An anti-clockspring mechanism is incorporated within film cassette 10 to prevent excess film from developing in the film path between the two film reels 18 and 20 prior to the cassette being inserted into the camera. It is also the function of the mechanism to prevent an operator from accidentally rotating a star drive 30, 32 on the outside of the cassette, thereby causing rotation of a film reel and introducing slack film into the film path or rewinding previously exposed film onto the supply.

A self-locking snubbing member 74 is biased by spring 76 into engagement against the reel pedestals 78 and 80 (FIG. 3) of the film reel shafts 26 and 28 and is intended to restrict the rotation of film reels 18 and 20 in a direction that may introduce excess film in the form of slack into the film path.

The snubbing member 74 is provided with teeth 82 which positively engage with teeth 84 and 86 about the periphery of the respective pedestals 78 and 80. As a result of this engagement, film reel 18 is prevented from rotating in a counterclockwise direction and film reel 20 cannot be rotated in a clockwise direction. However, rotation of film reel 20 in a counterclockwise direction and rotation of film reel 18 in a clockwise direction is permitted because the rotational forces in the directions just recited tend to oppose or counteract the biasing force of spring 76, thus allowing snubbing member 74 to be displaced sufficiently to allow teeth 84 and 86 on the respective reel pedestals 18 and 20 to ride over the teeth 74.

It should be noted that during loading of the film, the film reel 18 initially acts as the supply reel and can be rotated clockwise and film reel 20 initially acting as the take-up reel that can only be rotated in the counterclockwise direction. If film reel 20 is rotated counterclockwise to remove slack film snubbing member 74 is displaced out of the blocking engagement by moving against the force of spring 76. When film tension increases along the film path, resulting in counterclockwise rotational force on film reel 18, snubbing member 74 is drawn into engagement with pedestals 78, 80 prohibiting both film reels from further rotation in any direction.

If the operator wants to cinch additional film onto take-up reel 20, snubbing member 74 can be moved away from film reel pedestals 78 and 80 manually to allow free rotation of both the supply reel 18 and take-up reel 20.

Darkslide Operation

The film cassette 10 which is the subject of the present invention disclosure, has integral therewith a pair of selectively operable darkslide assemblies 88 and 90, comprising respective aperture plates 92, 94 which are adapted to cover respective exposure windows 96 and 98 when the cassette is not operatively positioned in the camera, thereby preventing unnecessary exposure of the film residing within the cassette when the cassette is not in use.

The darkslides 88 and 90 are constructed such that the appropriate one of the darkslides automatically uncovers the exposure window that is aligned with one of the optical path means 100 or 102 when the cassette is inserted into the camera.

Figure 9:
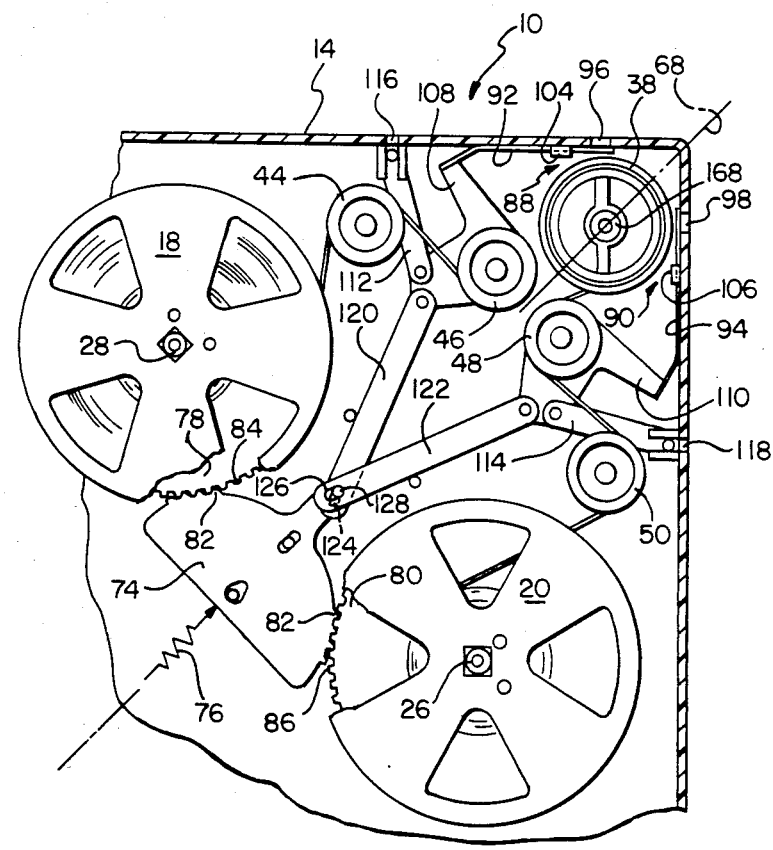
FIG. 9 is an elevational view of an enlarged portion of the film cassette illustrating the film path and anticlockspring mechanism in greater detail.

Referring particularly to FIG. 9, each aperture plate 92, 94 is comprised of a strip of spring material, such as steel which has the inherent characteristic of returning to a linear configuration after being relieved of a previously applied distorting force. Each aperture plate 92 and 94 is supported by parallel guides 104, 106 behind respective exposure windows 96 and 98 in the edge wall 14 of cassette base 12, which in turn are aligned with respective optical paths shown at numerals 100 and 102.

A first end of each aperture plate 92 and 94 is slidable in guide means in the edge wall 14 of the base 12 adjacent the corresponding exposure window. The second ends of the aperture plates 92 and 94 are connected to respective drakslide cranks 108 and 110 which are pivotable about respective axes of idler rollers 46 and 48.

The first ends of the darkslide crank 108 and 110 are pinned to respective actuator links 112 and 114, and the other ends of these links are confined by respective slots 116 and 118 which are perpendicular to the corresponding edge walls 14 adjacent exposure windows 96, 98. Also, at the same end of each darkslide, crank 108 and 110 is pinned to a respective snubbing link 120 and 122. The other end of the snubbing links have respective slotted openings 124, 126 which are connected to snubbing member 74 by a pin 128.

Figure 10:
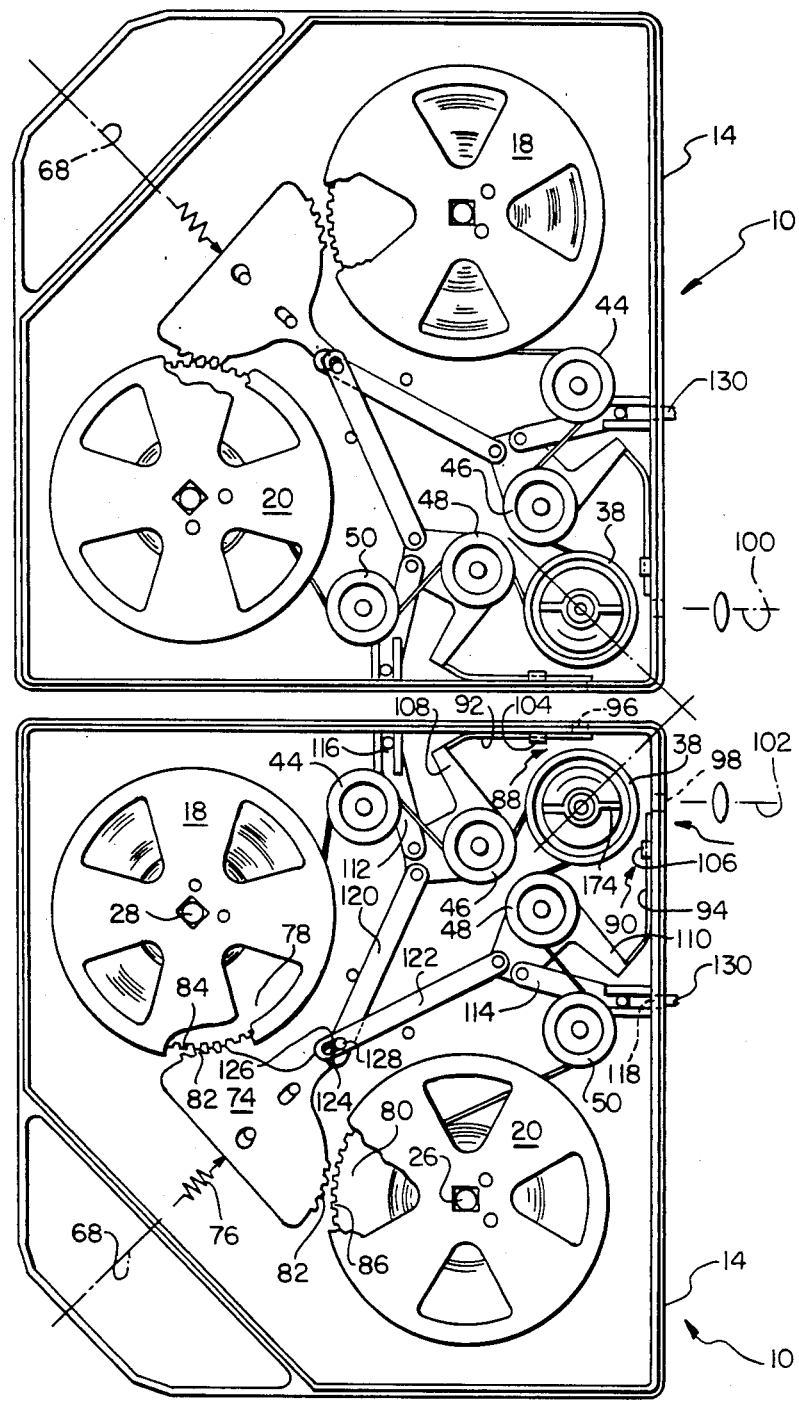
FIG. 10 is an elevational view of two film cassettes, with the covers removed, illustrating how they may be installed in a camera one above the other.

To automatically uncover the correct exposure window when the cassette is inserted into the cameera, a push rod 130 enters through the edge wall 14 of each cassette 10, forcing acutating link 114 along the slot 118 in the housing and causing the darkslide crank 110 to rotate (clockwise as illustrated in FIGS. 9 and 10) and to withdraw plate 94 from the exposure window 98 located on the same wall of the cassette that push rod 130 entered. Insertion of the push rod 130 and the resulting rotation of the darkslide crank 110 causes snubbing link 122 to force the snubbing member 74 away from pedestals 78 and 80, allowing them to rotate freely. Both the aperture plate 94 and the snubbing member 74 are returned to their previous positions when the push rod 130 is withdrawn from the wall 14 of cassette 10.

It should be noted that only the darkslide on the same wall that receives the push rod 130 is actuated. The other darkslide 88 remains closed as a result of the lost motion in the slot 124 in the end of the snubbing link 120 and allows the snubbing member 74 to move away without actuating the other darkslide 88.

Cassette Loading Mechanism

Figure 2:
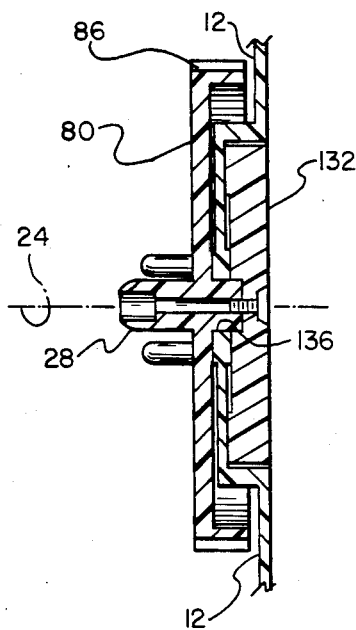
FIG. 2 is a sectional view taken along a diameter of an externally drivable film reel support pedestal shown in FIG. 1.

Because the film cassette 10 may be used in two different modes or orientations, it is necessary that film reels 18 and 20 be capable of being driven externally from either side of the cassette (either through base 12 or lid 16. When the drive is through base 12 of the cassette, star drives 132 and 134 (in the base 12) are keyed and fastened to the pedestal 78 and 80 and reel shafts 26, 28 respectively through a bearing surface 136 (FIG. 2) formed in base 12 of cassette 10. Alternatively, when the cassette is loading the other way, film reels 18 and 20 are driven through lid 16, via star drives 30 and 32 which are engaged by the drives in the camera.

Figure 11:
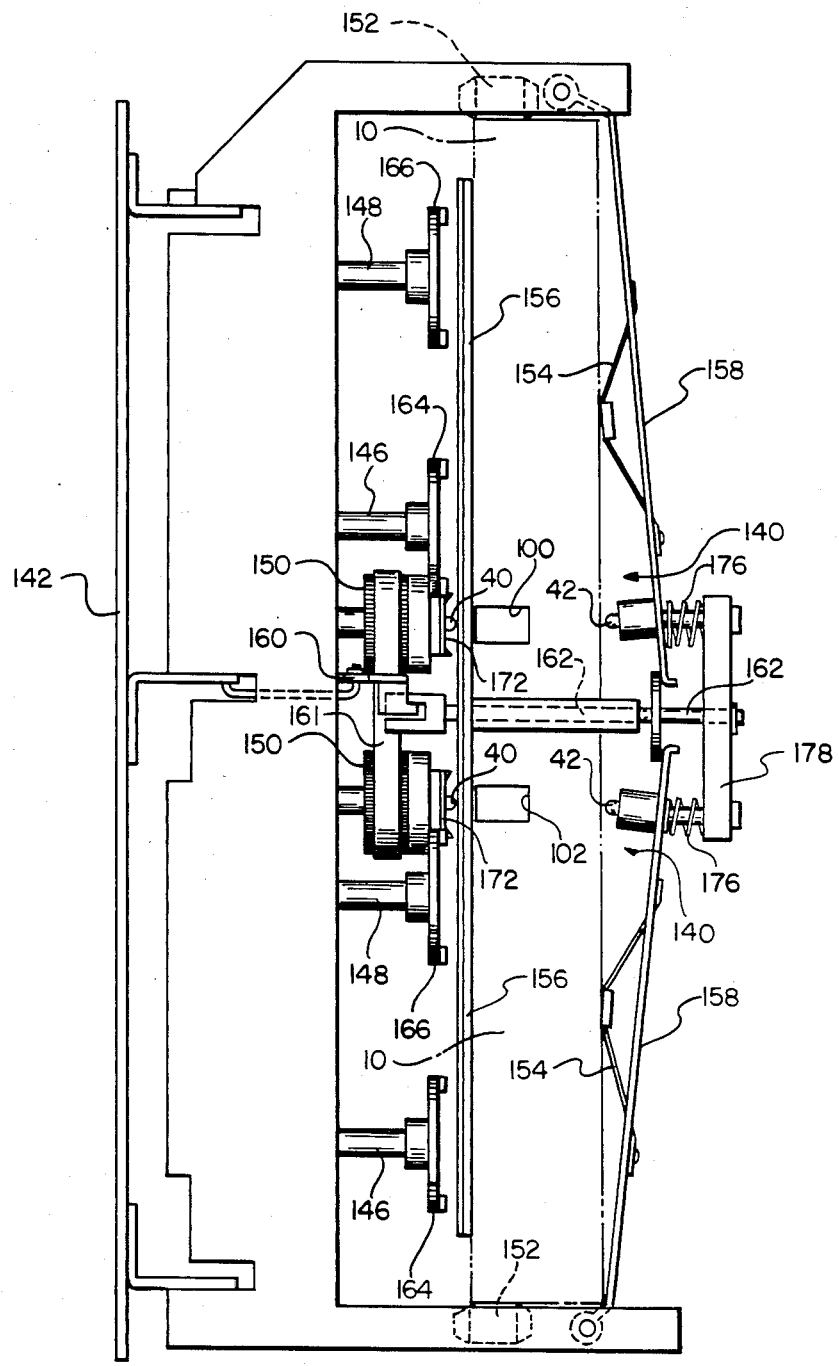
FIG. 11 is an elevational view of the film chamber in a microfilm camera with the access door shown in the open position.
Figure 12:
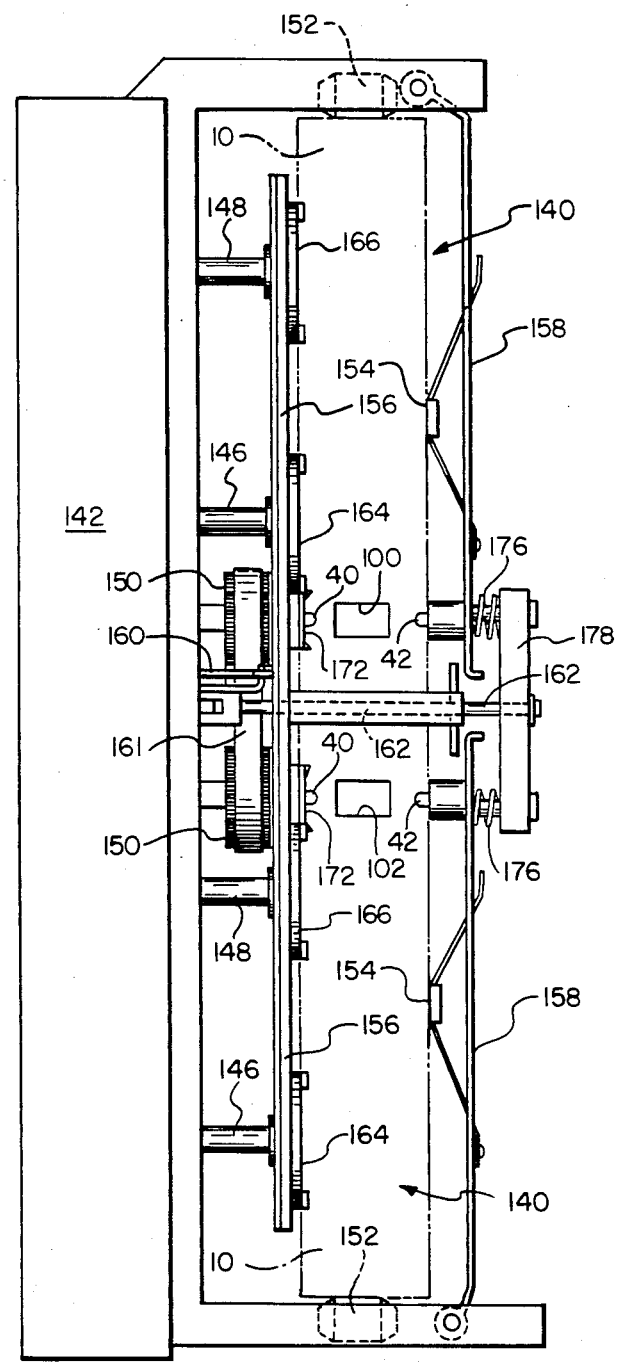
FIG. 12 is an elevational view of the film chamber in a microfilm camera with the access door shown in the closed position and external drive means properly positioned with respect to film cassettes.

Each film cassette 10 is manually loaded into the cassette chamber 140 through the cassette access door 142. Each film cassette 10 must be properly oriented prior to sliding it into the cassette chamber 140. Grooves and keyways (not shown) in each cassette 10 and within the cassette chamber 140 will allow full insertion of the cassette in only two orientations, as best shown in FIGS. 10, 11 and 12, which show one cassette positioned above the other, with the metering roller 38 of the cassettes being adjacent one another. Each cassette 10 slides horizontally into cassette chamber 140 until the leading edge of the cassette engages a stop (not shown). Once either one or both of the cassettes are in place, the access door 142 may be closed.

Final positioning of each cassette 10 relative to its corresponding reel drives, metering roller drive, and optical path occurs when the access door 142 is closed. Upon closing the access door, a mechanism within the cassette chamber 140 moves the cassettes laterally into proper relation to the foregoing and clamps the cassettes into position via corresponding end and side leaf springs 152, 154. The cassette aligning mechanism comprises a reference plate 156, a cassette biasing plate 158, a cassette access door 142, an actuating lever 160 and a connecting rod 162. Closing of the cassette access door 142 causes actuating lever 160 to pivot and draw the connecting rod 162 to the left in FIG. 11 resulting in the cassette biasing plate 158 urging the cassette toward the corresponding reel drives and metering roller drives. Movement of the cassette biasing plate 158 will in turn force the cassettes to move laterally against three registration points (not shown) and into the film drives as mentioned above. Simultaneously, the reference plate 156 moves with the cassette to a position slightly behind the engagement end of the film drive elements. The use of a leaf spring 154 allows for a compliant connection between the cassette 10 and the biasing plate 158. The film drive shafts 146 and 148 are provided with respective compliant drive hubs 164, 166 which are allowed to assume the same orientation as the star drive 30, 32 in the base 12 of each cassette to connect the drive shafts to the respective cassette reels.

Because the film must be positioned for each cassette relative to each optical path 100 and 102 both laterally and angularly, to very precise tolerances, flanged metering roller 38 is rigidly located in the machine through use of rigid locating pins 40 and 42 on either side of flanged metering roller 38. The drive pins 40, 42 align and precisely locate metering roller 38 by engaging on either side of the metering roller 38 cone shaped surfaces 168, 170 centered on the axis of rotation 64 of metering roller 38 which mates with a spherical end portions on the pair of opposing non-rotating locating pins 40, 42. As a result of the seating motion of the cassette when it moves toward the drives, one end of the metering roller comes into contact with the spherical surface of the first fixed pin 40. The other non-rotating pin 42 pivots into contact with the other end of metering roller 38 through the motion of cassette biasing plate 158.

The non-rotating spindle located on the drive side of the cassette chamber is affixed to the casing. Around this stationary spindle for each cassette is a metering roller drive hub 172, which is driven by belt 161. The drive hub 172 contacts and drives against a drive lug 174 on metering roller 38 rotating it about the fixed pin 40. The opposite or second non-rotating pin 42 is fixed to cassette biasing plate 158. This pin 42 is spring loaded against the metering roller 38 by a spring 176 which is located between biasing plate 158 and one end of a yoke 178 located at one end of connecting rod 162. Each of the two pins 40 and 42 has been accurately pre-aligned relative to either optical path 100, 102 in the microfilm camera.

The cassettes are easily removed by opening cassette access door 142 and manually sliding the cassettes from cassette chamber 140. In a similar but reverse action to that described above, the opening of the access door 142 forces the connecting rod 162 and biasing plate 158 away from the cassette (to the right in FIG. 9) for an initial 0.118 cm (0.30 inch) of travel. This also disengages one of the non-rotating pins 42 from metering roller 38. The remaining movement of connecting rod 162 to the right is approximately 0.078 cm (0.20 inch) and forces reference plate 156 to the right beyond the drives, thus disengaging the cassette from the drives. Cassette biasing plate 158 also continues to move approximately an additional 0.078 cm (0.20 inch) with the remaining motion of the connecting rod 162.

Cassette Orientation

Figure 3:
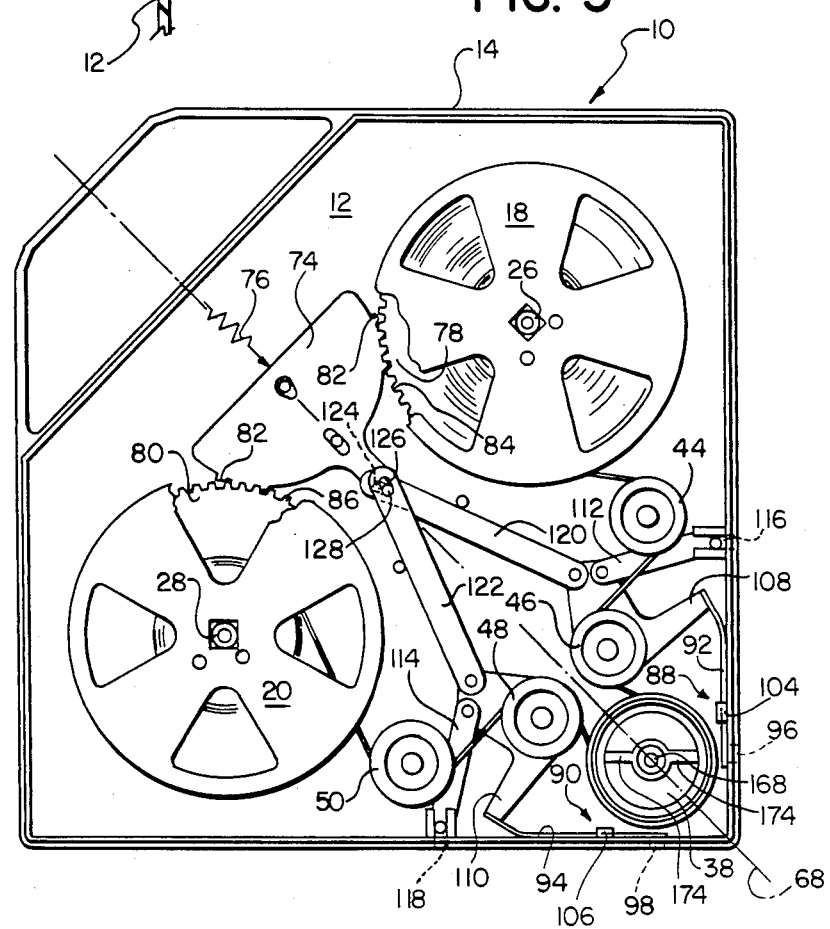
FIG. 3 is a plan view illustrating the film path within the cassette.

Thus, it can be seen that film cassette 10 illustrated in FIGS. 3, 9 and 10, is symmetrical about an axis of symmetry 68 which passes through a diameter of metering roller 38 and bisects the corner of cassette 10. This axis of symmetry 68 is in a plane (not shown) extending between film reels 18, 20 and bisecting the corner of cassette 10, with two exposure windows 96 and 98 adjacent the corner of cassette 10 and at respective opposite sides thereof, all being in a symmetrical relation to the diagonal plane extending between film reels 18 and 20 and containing the axis of symmetry 68.

Film cassette 10 is configured to support a dual film system where two rolls of film are exposed simultaneously so that identical images are placed on both pieces of film in each cassette, located one above the other as shown in FIG. 10. If the filming mode is either simplex or duplex, the film is simply unloading from the cassette after a single pass. After processing of the film, two identical rolls of film are provided, one may be used as a working film for viewing or used to make any required copies. The other film may be used as a backup or archival copy.

Duo or duo-duplex mode filming can be accomplished by removing the cassettes from the camera after exposing the first lateral half of the film. However, before the supply reels are depleted, each cassette 10 is "flipped" or rotated about its axis of symmetry 68 and reloaded into its cassette chamber 140 located in the camera so that the remaining lateral portion of the film is exposed through the second exposure window. This is a considerable improvement from existing microfilm systems which require taking the cassette to a darkroom, opening the cassette, removing the film from the take-up spindle and loading it onto the supply spindle, rethreading the film onto the new take-up reel, closing the cassette and returning it to the microfilm camera for exposure of the remaining half of the film.

Advantages and Industrial Applicability

By using the present invention, duo filming of microfilm may be performed without requiring that the film within the cassette be removed and reloaded, as in the past. Use of the described cassette allows the first lateral side of the film to be exposed and the cassette to then be rotated about its axis of symmetry and reloaded into the original drive location so that the second half of the film may be exposed through the second exposure window or image port. Use of a cassette configured according to the present invention would support a dual filming system where the two rolls of film are exposed simultaneously. Such a film mode can be used with either simplex or duplex so that two identically exposed rolls of film are provided after processing, thus creating a working roll and a backup or archival roll.

The invention is in a microfilm camera using a dual simplex, duplex, duo simplex, or dup-duplex filming mode. (It should be noted that a single cassette may be used and filming can be performed in the simplex, duplex, duo-simplex, or duo-duplex filming modes)

What is claimed is:

1. A film cassette for use in a microfilm camera having optical means for exposing film in said cassette, said cassette comprising:

a top member and a bottom member joined by wall means to define an enclosure having at least one corner;

a pair of rotatably supported film reels within said enclosure in symmetrical relation to a diagonal plane extending between said reels and bisecting said corner of said cassette;

means external to said cassette and engageable by said camera for driving said reels, thereby providing movement of the film between said reels;

means defining two exposure windows in said wall means adjacent said corner and at respective opposite sides thereof in symmetrical relation to said plane; and guide means within said enclosure for establishing a film path between said film reels and adjacent both exposure windows, whereby said cassette can be selectively inserted in said camera in either a first or a second mode of orientation to present a selected one of said exposure windows to said optical means.

2. The film cassette as set forth in claim 1 wherein duo recording can be accomplished by exposing half of said film in said first mode of orientation and exposing said remaining half of said film with the cassette in its second mode of orientation.

3. The film cassette as set forth in claim 1 wherein a darkslide is associated with each of said exposure windows, each slide being selectively removable when the corresponding window is aligned with said optical path upon insertion of said cassette in said camera.

4. A film cassette for use in a microfilm camera having optical means for exposing film in said cassette, said cassette comprising:
- a top member and a bottom member, one of said members having wall means formed around its periphery and being matingly engageable with said other member to define an enclosure having at least one corner;
- first and second film reels within said enclosure in symmetrical relation to a diagonal plane extended between said reels and bisecting said corner of said cassette;
- a metering roller positioned between said film reels and bisected by said plane;
- a length of said film having one end portion wound about said first film reel, an opposite end portion wound about said second film reel and an intermediate portion extending between said reels and being trained over said metering roller;
- means accessible externally of said cassette for rotating said reels and said metering roller for providing movement of the film between said film reels and over said metering roller;
- means defining two exposure windows in said wall means adjacent said corner and at respective opposite sides thereof in symmetrical relation to said positioned metering roller for establishing a film path adjacent both exposure windows;
- whereby said cassette can be selectively inserted in said camera in either a first or second mode of orientation to present a selected one of said exposure windows to said optical path.

5. A film cassette for use in a microfilm camera having optical means for exposing film in said cassette, said cassette comprising:
- a top member, a bottom member joined by wall means to define an enclosure having at least one corner;
- guide means located in said corner of said enclosure, a diagonal plane bisecting said corner and said guide means;
- rotatably supported film reels within said enclosure
- means external to said cassette and engageable by said camera for driving said reels in either direction, thereby providing movement of the film between said reels;
- means defining two exposure windows in said wall means adjacent said corner and at respective opposite sides thereof in symmetrical relation to said plane; and
- said guide means establishing a film path between said film reels and adjacent both exposure windows, whereby said cassette can be selectively inserted in said camera in either a first or second mode of orientation to present a selected one of said exposure windows to said optical means in said camera.

* * * * *